Feb. 9, 1926.

F. STEBLER

BEARING

Filed Feb. 14, 1923

1,572,093

INVENTOR
By Fred Stebler
Ackrow & Totten
ATTYS.

Patented Feb. 9, 1926.

1,572,093

UNITED STATES PATENT OFFICE.

FRED STEBLER, OF RIVERSIDE, CALIFORNIA.

BEARING.

Application filed February 14, 1923. Serial No. 618,908.

*To all whom it may concern:*

Be it known that I, FRED STEBLER, a citizen of the United States, residing at Riverside, in the county of Riverside and State of California, have invented certain new and useful Improvements in Bearings, of which the following is a specification.

This invention relates to an improved antifriction bearing for use on roller conveyors and like apparatus, and is especially adapted to that class of conveyor wherein solid rollers of the wooden type or hollow rollers of the tubular metallic type are arranged in close parallel relation for the purpose of supporting belts for the transmission of boxes and packages of various sorts and shapes, as well as those conveyors wherein the rollers are placed quite close together and the boxes or packages ride in direct contact over the rollers, generally termed gravity conveyors.

In this latter type especially, it is of the greatest importance that each individual roller is mounted to rotate with the most perfect freedom, so that the incline of the conveyor need be very slight, enabling it to cover a much longer or larger range than would be the case if more incline were needed.

An object of the invention resides in providing a type of ball anti-friction bearing that is particularly adapted to take both thrust and radial strains and that is so constructed and assembled that it forms a complete inseparable unit with the roller and shaft and is not ordinarily removable therefrom without the use of suitable tools and appliances, and that when mounted will maintain its alignment and adjustment under quite severe conditions of operation.

Another object of the invention resides in shaping one of the bearing members as a somewhat closed housing, which, when assembled with the mating member forms a chamber in which a quantity of heavy grease or like material may be placed to thoroughly lubricate the bearing and to assist very materially in keeping dust, grit and moisture away from the balls and bearing surfaces, thus assisting greatly in prolonging the useful life of the bearing and render it highly efficient in operation.

Conveyors of these types are many times located in warehouses, unheated buildings and areaways where they are subjected to all of the climatic changes incident to such places and any type of bearing unless protected in some manner by moisture resisting material such as grease or soap and oil compounds will quickly deteriorate and become inefficient in operation.

In the case of ordinary journal bearings corrosion moves so rapidly and persistently that many are soon so roughened and pitted that friction set up thereby so interferes with their movement that the rollers fail to turn freely under a load of boxes or packages with the result that congestion occurs and interferes with the rapid and economical movement of goods and materials.

With such objects in view, as well as other advantages which may be incident to the use of the improvements, the invention consists in the procedure and in the parts and combinations thereof hereinafter set forth and claimed, with the understanding that the several necessary elements constituting the same may be varied in proportion and arrangement without departing from the nature of the invention.

In order to make the invention more clearly understood there are shown in the accompanying drawings means for carrying the same into practical effect, without limiting the improvements in their useful applications, to the particular constructions, which, for the purpose of explanation, have been made the subject of illustration.

In the drawings accompanying this specification like figures of reference indicate like parts in the several views.

Figure 1:
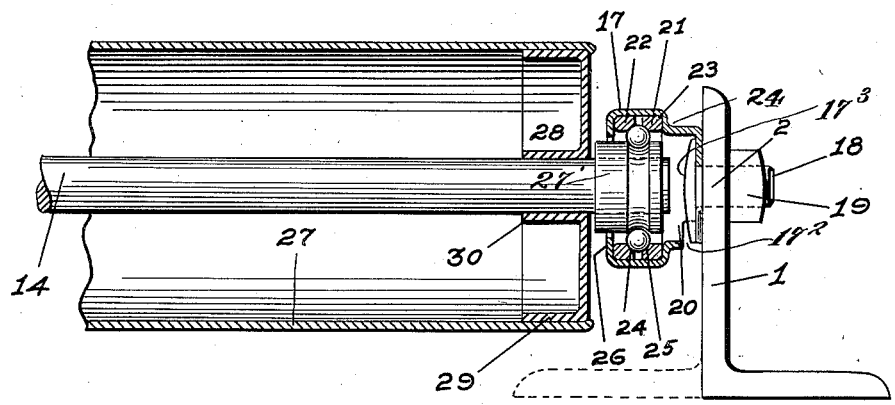
Fig. 1 represents a form of my improved bearing as applied to a shaft carrying a tubular metal roller.
Figure 2:
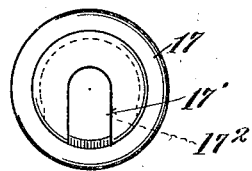
Fig. 2 is a view in end elevation of the bearing housing in Fig. 1.

In the construction and placing of conveyors of the types referred to it is the general practice to build an inclined runway along the route of conveyance. Along the top of this preliminary runway I would place a string of angle irons, end to end to form supporting means for the rollers. There would be parallel lines of these similar to a railroad track. The vertical flange of each angle iron would have holes drilled or punched at regular intervals and so spaced as to accommodate existing conditions of construction. These angle irons I designate by the numeral 1. It is to be noted that the foot of the angle may be turned in either direction. 2 represents the holes referred to.

The bearing housing member 17 is made of a pressed steel shape and is secured to the angle iron rail 1 by means of the carriage bolt and nut 18 and 19. The end wall of the housing 17 is radially slotted as at 17' to receive the shank of bolt 19 and permit the ready positioning and removal of the housing from the bolt. At the open end of slot 17' the housing is cut as at 17² to receive the bolt head 17³. A chamber 20 is located in this housing similar to the other type. In this type of bearing the outer raceway is formed by the placing of two bearing members 21 and 22 into the enlarged annular space 23 of the member 17. These bearing members would preferably be friction tight and so placed and adjusted that a perfectly shaped raceway would be formed by the concaved surfaces 24 and 25 of the members 21 and 22. In this raceway are mounted the balls 24'. The bearing members 21 and 22 which may be referred to as mating or cooperating bearing members would be secured in place by turning over of the edge of the member 17 as is indicated by 26. The inturned edge of this housing would just clear contact with the shaft 14. The chamber 20 is now completed and is practically fully enclosed. End thrusts with the bearing of Fig. 1 will be taken up by means of the two members 21 and 22 and radial thrusts will be absorbed by the member 27' and the two members 21 and 22. It is understood that radial and end thrusts are so intermingled and combined that both must be absorbed at the same time, my description therefore is only relative and is not intended to convey the idea that they are always acting independently.

In Fig. 1 I have shown a tubular roller 27 having a head 28 formed with an outer flange 29 and an inner hub 30. This tubular roller may be secured to the shaft 14 in any well known manner and the head 28 may be secured in the end of the tube by means of welding, brazing or riveting as may be desired.

In the drawings I have shown only one end of a conveyor roller; it will be understood that each roller has a similar bearing on each end.

If the chamber 20 is filled with a suitable grease or one of the soap and oil compounds, the greatest enemy to ball bearings, "moisture", will be most effectively eliminated and the life and efficiency of my improved bearing will be many times that of previous bearings designed for this difficult service and exposure. I realize that it is not new to fill the cases of ball bearings with such compounds but I believe I have produced a design and construction of bearing for this duty that is much superior to anything previously known or used and that the design and structure and general arrangement is what I claim as new and desire to cover by Letters Patent.

It will be observed that I provide an anti-friction roller bearing wherein either wood or metal rollers may be interchanged, also that the end of the roller contacting with the end of the inner bearing transmits the roller end thrust thereto which is absorbed by the balls.

Having thus described my invention, what I claim as new and desire to secure by Letters Patent, is:—

A combined radial and thrust ball-bearing, comprising a pressed metal housing open on opposite sides, one opening being of relatively small size, securing means received in said small opening for removably securing said housing to a fixed support whereby a chamber is formed in said housing, a shouldered annular recess adjacent the open side of said housing for receiving and holding in operative alignment a portion of said ball bearing, an inner bearing member having a raceway together with means for attachment to a support, balls interposed between said parts forming said ball bearing whereby said parts are held in complete unitary alignment.

In testimony whereof I have signed my name to this specification.

FRED STEBLER.